United States Patent
Davis

(10) Patent No.: US 6,192,847 B1
(45) Date of Patent: Feb. 27, 2001

(54) METHOD AND APPARATUS FOR SELECTIVELY CONTROLLING THE SPEED OF AN ENGINE

(75) Inventor: Roy Inge Davis, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/339,260

(22) Filed: Jun. 24, 1999

(51) Int. Cl.[7] .................................................. F02N 17/00
(52) U.S. Cl. ............................................................ 123/179.4
(58) Field of Search .......................... 123/179.3, 179.4, 123/198 DB; 290/30 R, 38 C

(56) References Cited

U.S. PATENT DOCUMENTS

| | | | |
|---|---|---|---|
| 4,066,941 | 1/1978 | Foster | 318/341 |
| 4,454,843 | * 6/1984 | Uchida et al. | 123/179 B |
| 4,494,497 | * 1/1985 | Uchida et al. | 123/179 B |
| 4,510,396 | * 4/1985 | Uchida et al. | 290/36 R |
| 5,325,827 | 7/1994 | Fasola | 123/179.3 |
| 5,337,713 | 8/1994 | Mills | 123/179.3 |
| 5,495,127 | 2/1996 | Aota et al. | 290/38 R |
| 5,548,507 | * 8/1996 | Schroeder et al. | 451/121 |
| 5,632,238 | 5/1997 | Furukawa et al. | 123/179.3 |
| 6,011,373 | * 1/2000 | McConnell et al. | 318/560 |

FOREIGN PATENT DOCUMENTS 3-31550   2/1991   (JP) .

OTHER PUBLICATIONS

Joseph Edward Shigley, John Joseph Uicker,Jr., Theory of Machines and Mechanisms, 1995, Chapter 5, pp. 201–249, Second Edition, McGraw Hill.

* cited by examiner

Primary Examiner—Henry C. Yuen
Assistant Examiner—Mahmoud M Gimie
(74) Attorney, Agent, or Firm—Mark S. Sparschu

(57) ABSTRACT

A control assembly 12 for use within a vehicle 10 having an engine 14 and which selectively controls the speed of the engine 14 in order to increase fuel efficiency and to effect relatively smooth starting and stopping of the engine. Particularly, in one embodiment, control assembly 12 cooperatively operates with a starter/alternator assembly 20 and is adapted for use with hybrid vehicles employing a start/stop powertrain assembly, wherein fuel efficiency is increased by selectively stopping engine operation when the vehicle has stopped.

17 Claims, 4 Drawing Sheets

METHOD AND APPARATUS FOR SELECTIVELY CONTROLLING THE SPEED OF AN ENGINE

This invention was made with Government support under Prime Contract No. DE-AC36-83CH10093, Subcontract No. ZCB-4-13032-02, awarded by the United States Department of Energy. The Government has certain rights in this invention.

FIELD OF THE INVENTION

This invention relates to engine speed control and more particularly, to a method and to an apparatus for selectively and automatically controlling the speed of an engine, effective to selectively cause the engine to be started and/or stopped in a relatively smooth manner.

BACKGROUND OF THE INVENTION

Vehicle fuel consumption and vibration reductions are very desirable; the desirability of the former being due to governmental regulations regarding tailpipe emissions and corporate average fuel economy, as well as to concerns related to the rising cost of gasoline and the rather limited existing worldwide supply of oil, while the desirability of the latter is due to a desire to provide a rather "smooth" and comfortable ride for the drivers and/or occupants of the vehicle.

As an engine is "started", the engine block rotates upon its mounts and generates vibrations which are undesirably coupled to the passenger compartment. Moreover, as the engine is "stopped", it typically reverses direction and further causes undesirable engine mount vibrations which are undesirably coupled to the passenger compartment. Additionally, as the engine is "started" or "stopped", the engine assumes and/or produces characteristic vibrational frequencies which are substantially similar to the low frequency resonant modes of the vehicle drivetrain, thereby undesirably exciting the drivetrain and further producing undesirable vehicle vibrations which are communicated to the passenger compartment and which potentially and structurally damage the drive train.

Moreover, fuel is unnecessarily consumed each time that the vehicle is in an idle state (e.g., each time that the engine is operating but the vehicle is not moving, such as at a stop sign or at a red traffic light), since fuel is combusted without producing vehicle motion. Therefore, "start/stop" powertrains are being designed for automotive vehicles in which the engine is stopped during those times when the vehicle would normally be in an idle state, and started automatically upon a driver demand for vehicle motion, such as when the accelerator is depressed. This "start/stop" powertrain therefore enables an overall improvement in fuel efficiency of the vehicle. With the attendant increase in the number of engine "starts" and "stops", and in light of the fact that these engine "starts" and "stops" are not explicitly commanded by the vehicle operator, there is a need to reduce the amount of undesired vehicle vibrations caused during the starting and stopping of the engine. Applicant's invention addresses these needs.

SUMMARY OF THE INVENTION

It is a first object of the invention to provide a vehicle which overcomes at least some of the previously delineated drawbacks associated with prior vehicles.

It is a second object of the invention to provide an assembly for selective use within a vehicle and which allows at least some of the previously delineated drawbacks associated with prior vehicles to be desirably addressed.

It is a third object of the invention to provide an assembly for use within a vehicle and which substantially and automatically controls the speed of the engine during engine "starts" and "stops" in a manner which increases the overall fuel efficiency of the vehicle.

It is a fourth object of the invention to provide an assembly for use within a vehicle and which substantially and automatically controls the speed of the engine in a manner which produces smoother "starting" or "stopping" of the engine.

According to a first aspect of the present invention, a vehicle is provided. The vehicle includes an engine which may be selectively started, and a controller being coupled to the engine and generating speed control commands which cooperatively define a speed profile and which are cooperatively effective to cause the engine to be started according to the defined speed profile.

According to a second aspect of the present invention, the controller generates speed control commands which cooperatively define a speed profile and which are cooperatively effective to cause the engine to stop according to the defined speed profile.

According to a third aspect of the present invention, a method to control the speed of a vehicle engine is provided. The method includes the steps of producing a speed profile; generating a plurality of speed commands by use of the speed profile, each of the plurality of speed commands defining a certain speed; and causing the engine to operate at each of the certain speeds defined by each of the plurality of speed commands.

These and other features, aspects, and advantages of the present invention will become apparent by reading the following detailed description and by reference to the following drawings.

DETAILED DESCRIPTION OF THE PREFERRED EMBODIMENT OF THE INVENTION

Figure 1:
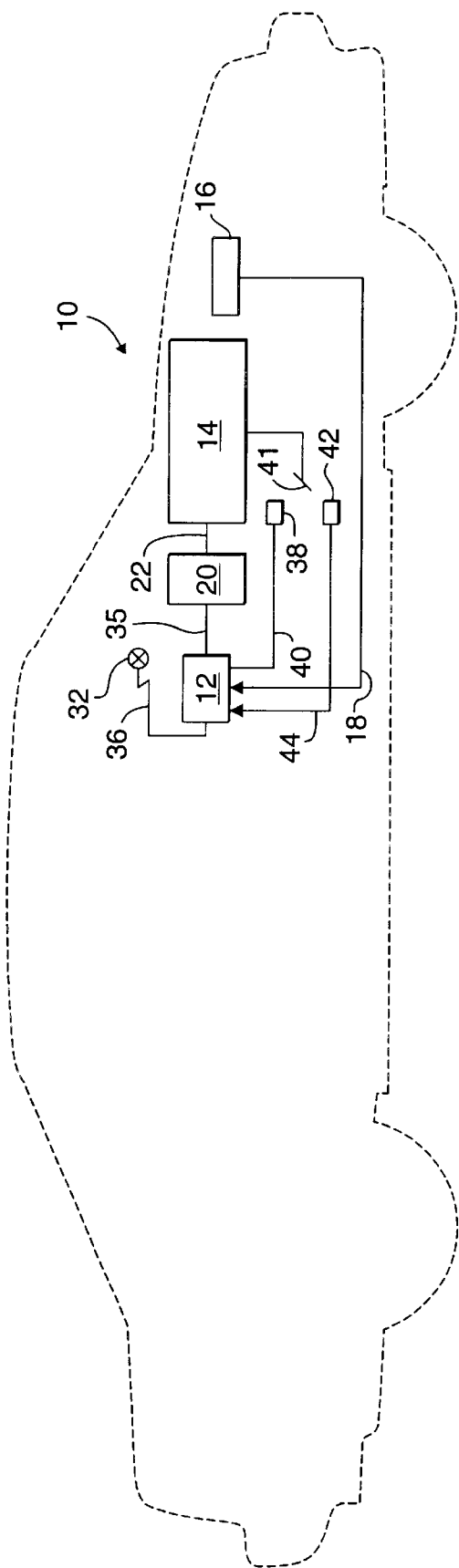
FIG. 1 is a block diagram of a vehicle employing a controller assembly made in accordance with the teachings of the preferred embodiment of the invention.

Referring now to FIG. 1, there is shown a vehicle 10 which includes a control assembly 12 which is made in accordance with the teachings of the preferred embodiment of the invention. In one embodiment, vehicle 10, apart from the operably contained control assembly 12, is a conventional hybrid vehicle having, for example and without limitation, a conventional engine 14, a battery 16 which selectively provides electrical power to control assembly 12 by bus 18, and a starter/alternator assembly 20 which is coupled to the crankshaft 22 of engine 14, which is coupled to control control assembly 12 by bus 35, and which is operatively effective to selectively control the speed of the engine 14. Assembly 20 therefore physically, communicatively, and operably couples control assembly 12 to engine 14. Assembly 20 is preferably an induction machine, but the present invention is not limited to that embodiment. Vehicle 10 further includes a conventional engine speed sensor 38 and a conventional ignition switch 32. The remaining components/assemblies operably contained within the conventional hybrid vehicle 10 are not shown.

Figure 2:
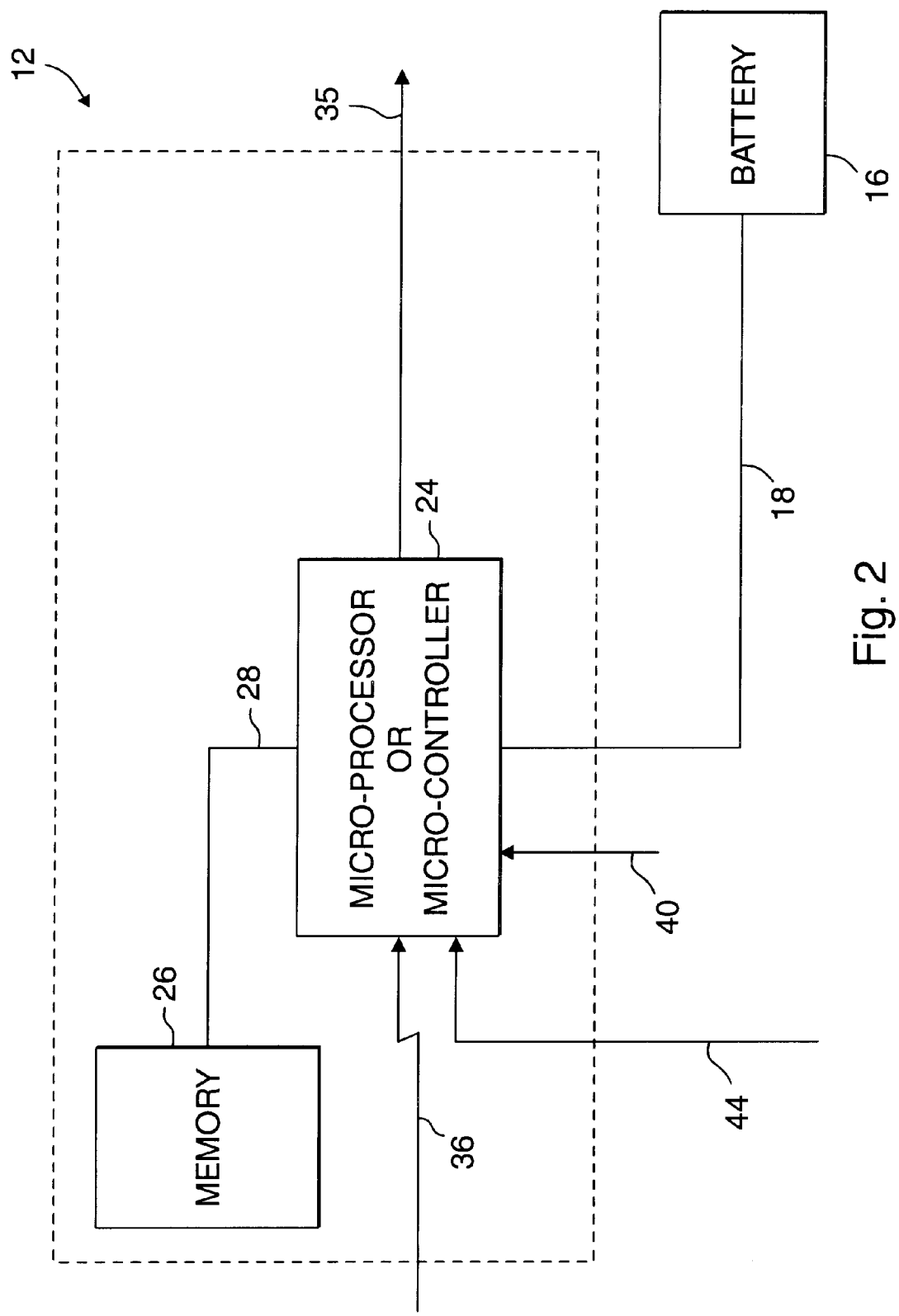
FIG. 2 is a block diagram of the controller assembly which is shown in FIG. 1.

As shown best in FIG. 2, control assembly 12, in one non-limiting embodiment, includes a micro-controller or microprocessor 24 which operates under stored program control. Control assembly 12 further includes a conventional memory portion 26 which selectively and storably contains the control program and which is coupled to processor 24 by bus 28. Control assembly 12 also includes at least one control algorithm which is stored in memory 26 and which is executed by microprocessor 24 in order to cause microprocessor 24 to selectively generate speed control output command signals onto bus 35.

In one non-limiting embodiment, the control algorithm is a conventional "proportional plus integral controller" type algorithm which is well known in the art. Other types of controllers or command signal output devices or assemblies may also and selectively be used within control assembly 12. Processor 24 is also coupled to the vehicle ignition switch 32 by bus 36 and, in one non-limiting embodiment, uses the position of the ignition switch to determine when an operator or user of vehicle 10 desires to "start" or "stop" the vehicle. Processor 24 is further coupled to the conventional engine speed sensor 38, by use of bus 40, and, in one non-limiting embodiment, operatively uses the speed sensor 38 (e.g., placed upon and/or within and/or in close proximity to the engine 14) to respectively determine the engine speed. Processor 24 is further coupled to a conventional accelerator position sensor 42, by use of bus 44, and in another non-limiting embodiment, operatively uses the sensor 42 (e.g., placed upon and/or in close proximity to the accelerator 41) to determine when the engine is to be idled, is required to be moved after being idled, and/or to determine the speed of the engine 14.

In operation, at least two speed profiles are stored within memory 26; each of the two speed profiles comprising a separate and sequential listing, schedule, and/or arrangement of engine speed commands, each of which correspond to a unique engine speed which is to be selectively and sequentially accomplished by the starter/alternator 20 in a certain predetermined order. The first of the stored speed profiles or ordered speed schedules is output onto bus 35 when the processor 24 senses that the vehicle is being started from an existing and inoperative state (e.g., when the ignition switch 32 is being "turned" to the "start" position or when the vehicle has been idled and the accelerator 41 is being depressed as indicated by sensor 42). The second of these speed profiles is used and is selectively output onto bus 35 when the processor 24 senses that the vehicle is stopped or that the operator/user desires to place the engine 14 in an inoperative state (e.g., when the ignition switch 32 is being "turned" to the "off" position). Hence, the first profile is a "start" profile while the second of the profiles is a "stop" profile. Each of these generated speed profiles are effective to cause starter/alternator assembly 20 to control engine 14 in accordance with the respective sequential speeds found and/or contained within the stored profiles.

These "profile" commands are communicated to the starter/alternator 20 by the processor 24 and cooperatively cause the starter/alternator 20 to cause the engine 14 to be respectively "started" and "stopped" very smoothly, thereby minimizing the occurrence of acceleration induced "jerk" and the concomitant undesired generation of vibrations, thereby increasing passenger comfort. Importantly, in one non-limiting embodiment of the invention, processor 24 automatically "stops" the engine 14 according to the second stored profile, every time that the engine 14 has been idled, thereby conserving fuel.

While many different types of speed profiles may be used, in one non-limiting embodiment of the invention, each profile is based upon the equations found within the text entitled *Theory of Machines and Mechanisms*, 2nd Edition, by J. E. Shigley and J. J. Uicker, McGraw-Hill, 1995, which is fully and completely incorporated herein by reference, word for word and paragraph for paragraph.

Particularly, in one non-limiting embodiment, the "Shigley/Uicker" cam design guidelines for "cycloidal rise motion" set forth at page 219 of the Shigley/Uicker text are employed in the manner set forth below. Particularly, the term "v (θ)" corresponds to cam position for the cycloidal motion and, in this embodiment, is used as the engine speed profile. The cam profile velocity and acceleration respectively correspond, in this non-limiting embodiment, to engine acceleration and jerk. The term "x (θ)", the integral of "v (θ)", corresponds to the engine position profile. By way of example and without limitation, it is known that the speed of the engine 14 in revolutions per minute ("rpm") may be calculated as follows:

$$rpm = \frac{\pi \cdot rad}{30 \cdot sec} \quad \text{Equation 1}$$

The engine velocity profile is selected as follows:

$$v(\theta) = L \cdot \left( \frac{\theta}{\beta} - \frac{1}{2 \cdot \pi} \cdot \sin\left(\frac{2 \cdot \pi \cdot \theta}{\beta}\right) \right) \quad \text{Equation 2}$$

which by integration, yields the following position profile:

$$x(\theta) := \left[ \frac{\theta \cdot L}{2 \cdot \beta} + \frac{\beta \cdot L \cdot \cos\left(2 \cdot \pi \cdot \frac{\theta}{\beta}\right)}{4 \cdot \pi^2} \right] - \frac{\beta \cdot L}{4 \cdot \pi^3} \quad \text{Equation 3}$$

Where in one non-limiting embodiment:
L=800·rpm=target "lift" corresponding to the target speed for the engine 14; and where
β=0.2 to about 0.3· sec=cam period corresponding to the start time in seconds.

The acceleration and jerk profiles for the engine speed respectively correspond, in this non-limiting example, to the following cam velocity and acceleration profiles, the cam velocity having a relatively small peak value and the cam acceleration being relatively small, particularly in comparison with an "uncontrolled" condition:

$$a(\theta) := \frac{L}{\beta} \cdot \left(1 - \cos\left(\frac{2 \cdot \pi \cdot \theta}{\beta}\right)\right) \quad \text{Equation 4}$$

$$j(\theta) := \frac{2 \cdot \pi \cdot L}{\beta^2} \cdot \sin\left(\frac{2 \cdot \pi \cdot \theta}{\beta}\right) \quad \text{Equation 5}$$

Hence, the generation by processor 24 of a start speed profile according to Equation 3, and control of engine 14 via starter-alternator 20 to follow that start speed profile, causes relatively small peak acceleration and relatively small jerk (i.e., a smooth acceleration profile) in the rotation of engine 14. This translates to improved "feel" in the vehicle and reduced mechanical stress on the powertrain of the vehicle.

Similarly, for the stop "phase" or "profile", the "full return cycloidal motion" profile is selectively used, which is set forth, for example and without limitation on page 223 of Shigley/Uicker text. Particularly, the velocity is calculated as follows:

$$vr(\theta) := L \cdot \left(1 - \frac{\theta}{\beta} + \frac{1}{2 \cdot \pi} \cdot \sin\left(\frac{2 \cdot \pi \cdot \theta}{\beta}\right)\right) \quad \text{Equation 6}$$

Which by integration, yields the desired position profile:

$$xr(\theta) := \theta \cdot L - \frac{L - \theta^2}{2 \cdot \beta} - \frac{\beta \cdot L \cdot \cos\left(2 \cdot \pi \cdot \frac{\theta}{\beta}\right)}{4 \cdot \pi^2} + \frac{\beta \cdot L}{4 \cdot \pi^2} \quad \text{Equation 7}$$

The return acceleration and jerk profiles are as follows:

$$ar(\theta) := -\frac{L}{\beta} \cdot \left(1 - \cos\left(\frac{2 \cdot \pi \cdot \theta}{\beta}\right)\right) \quad \text{Equation 8}$$

$$jr(\theta) := \frac{-2 \cdot \pi \cdot L}{\beta^2} \cdot \sin\left(\frac{2 \cdot \pi \cdot \theta}{\beta}\right) \quad \text{Equation 9}$$

Similarly, the "stop" speed profiles are calculated and/or used by processor 24 according to Equation 6, which causes relatively small peak acceleration and relatively small jerk values. Hence, the above-delineated equations are selectively used within the controller 12 to calculate the desired speed profiles in a manner which reduces jerk and peak acceleration for both the "starting" and "stopping" operation, while still permitting very fast engine starts and stops.

Figure 3:
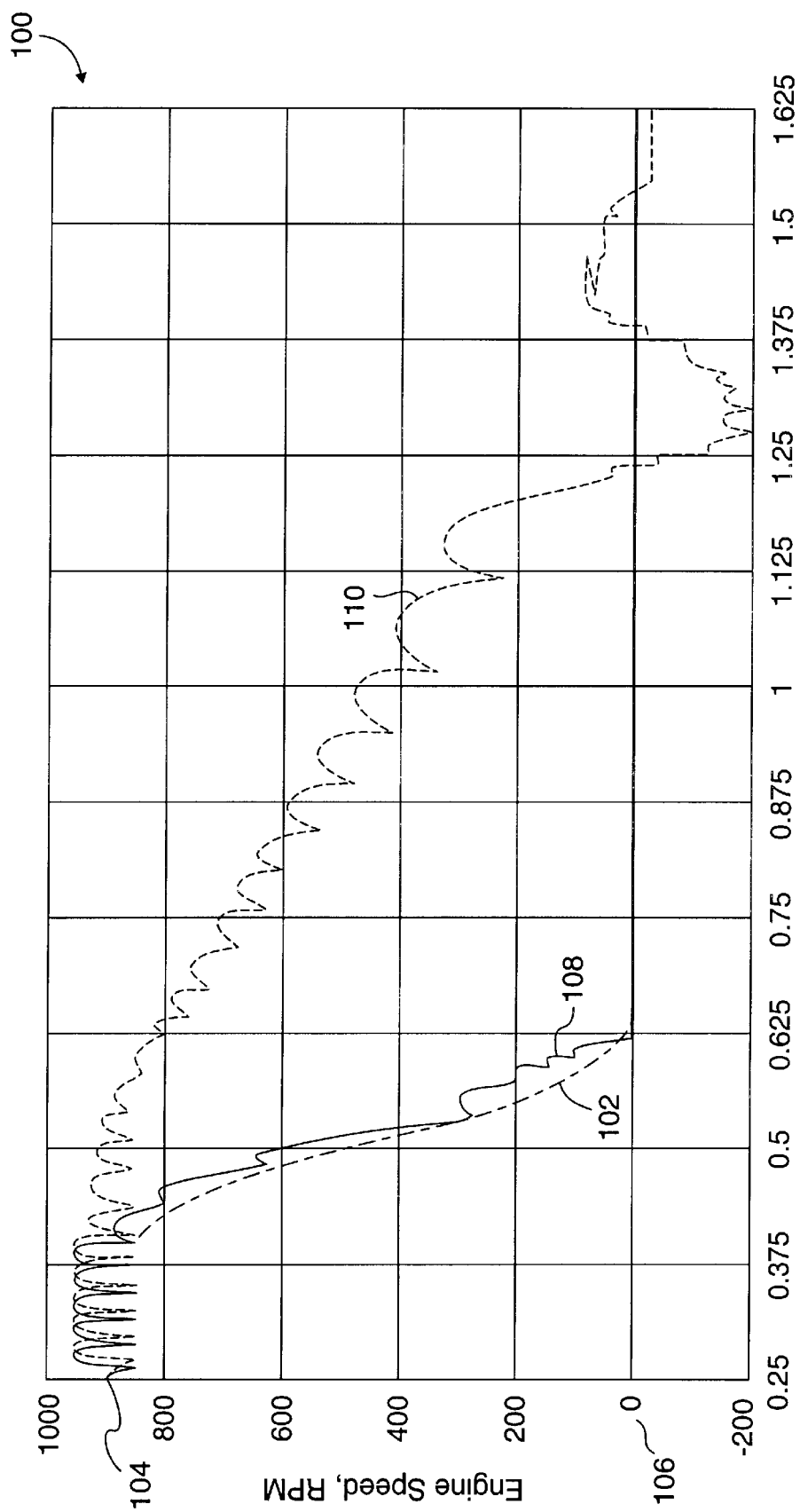
FIG. 3 is a graph illustrating a "stop" speed profile used by the controller assembly shown in FIGS. 1 and 2.

As shown best within graph 100 of FIG. 3, control assembly 12, utilizes one "stop profile" 102 which causes engine 14 to be "stopped" from a speed 104 of about 900 revolutions per minute ("rpm") to a speed 106 of about zero in about 0.625 seconds. The actual speed progression is shown in curve 108. As shown in curve 110, the "uncontrolled stop" of engine 14 occurs over a much longer period of time (e.g., about 1.625 seconds). Further, the "uncontrolled stop" induces much greater and undesired vibration and includes larger components of acceleration and jerk.

Figure 4:
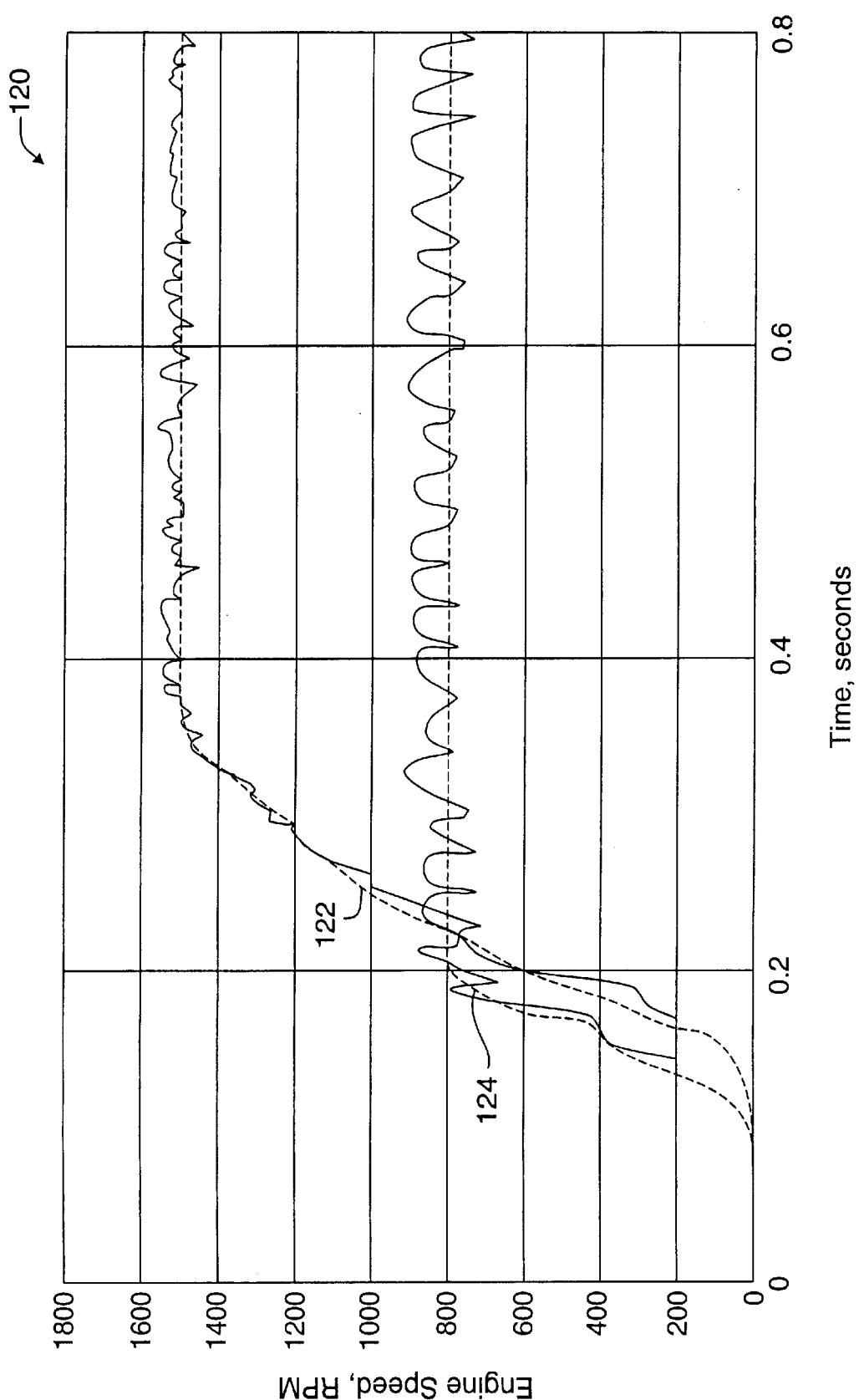
FIG. 4 is a graph illustrating two "start" speed profiles used by the controller assembly shown in FIGS. 1 and 2.

As shown best within graph 120 of FIG. 4, control assembly 12, by use of a first start profile, as shown within curve 122, causes engine 14 to "start" and reach an actual speed of about 1500 rpm within about 0.3 seconds. A second profile, as shown within curve 124, causes engine 14 to reach a speed of about 800 rpm in about 0.2 seconds.

Moreover, it should be realized that the foregoing invention is equally applicable to conventional and commercially available internal combustion engines and, in that arrangement, control assembly 12 is also communicatively and operably connected to the engine's starter/alternator assembly.

It is to be understood that the foregoing invention is not to be limited to the exact construction and embodiment which has been delineated but that various changes may be made without departing from the spirit and the scope of the invention.

What is claimed is:

1. A vehicle having an engine which may be selectively started, an electric machine which is coupled to said engine and which is effective to variably control the speed of said engine, and a controller being coupled to said electric machine and generating speed control commands having varying values which cooperatively define a selected speed profile including a plurality of predetermined speeds and which are cooperatively effective to cause said electric machine to start said engine according to said defined speed profile.

2. A vehicle as recited in claim 1, wherein said electric machine comprises a starter/alternator.

3. A vehicle as recited in claim 2, wherein said speed profile is derived from a cam motion profile.

4. A vehicle as recited in claim 2, wherein said speed profile is derived from a cycloidal motion profile.

5. A vehicle having an engine which is selectively operated and which may be selectively stopped, an electric machine which is coupled to said engine and which is effective to variably control the speed of said engine, and a controller being coupled to said electric machine and selectively generating speed control commands having varying values which cooperatively define a selected speed profile including a plurality of predetermined speeds, said speed control commands being cooperatively effective to cause said electric machine to stop said engine according to said defined speed profile.

6. A vehicle as recited in claim 5, wherein said electric machine comprises a starter/alternator.

7. A vehicle as recited in claim 6, wherein said speed profile is derived from a cam motion profile.

8. A vehicle as recited in claim 6, wherein said speed profile is derived from a cycloidal motion profile.

9. A method to control the speed of a vehicle engine, said method comprising the steps of:

producing a plurality of speed profiles;

generating a plurality of speed commands by use of said plurality of speed profiles, each of said plurality of speed commands defining a certain speed;

providing an electric machine which is effective to variably control the speed of said engine;

coupling said electric machine to said engine;

communicating said plurality of speed commands having varying values to said electric machine, effective to selectively cause said engine to start and stop according to said plurality of speed profiles.

10. A method as recited in claim 9, wherein said electric machine is effective to cause said engine to operate at each of said certain speeds while said engine is being stopped.

11. A method as recited in claim 10, wherein said plurality of speed commands is selected to reduce an acceleration or jerk in rotation of said engine when said engine is being stopped.

12. A method as recited in claim 11, wherein said plurality of speed commands follow a cam profile.

13. A method as recited in claim 11, wherein said plurality of speed commands follow a cycloidal profile.

14. A method as recited in claim 9, wherein said electric machine is effective to cause said engine to operate at each of said certain speeds while said engine is being started.

15. A method as recited in claim 14, wherein said plurality of speed commands is selected to reduce an acceleration or jerk in rotation of said engine when said engine is being stopped.

16. A method as recited in claim 15, wherein said plurality of speed commands follow a cam profile.

17. A method as recited in claim 15, wherein said plurality of speed commands follow a cycloidal profile.

* * * * *